Feb. 6, 1945.  A. C. FISCHER  2,368,650
SELF RESTORING WATER STOP AND OTHER WATER-PROOFING PACKINGS
Filed June 6, 1941  2 Sheets-Sheet 1

FOAMED LATEX

REJUVENATED STRATUM SPONGE RUBBER

RUBBERIZED BITUMINOUS MATERIAL
ADHESIVE

Inventor;
ALBERT C. FISCHER,
By Knight Bros
Attorneys

Feb. 6, 1945. A. C. FISCHER 2,368,650
SELF RESTORING WATER STOP AND OTHER WATER-PROOFING PACKINGS
Filed June 6, 1941 2 Sheets-Sheet 2
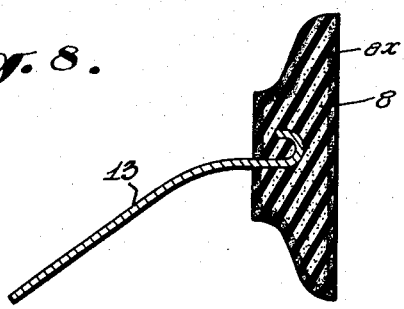
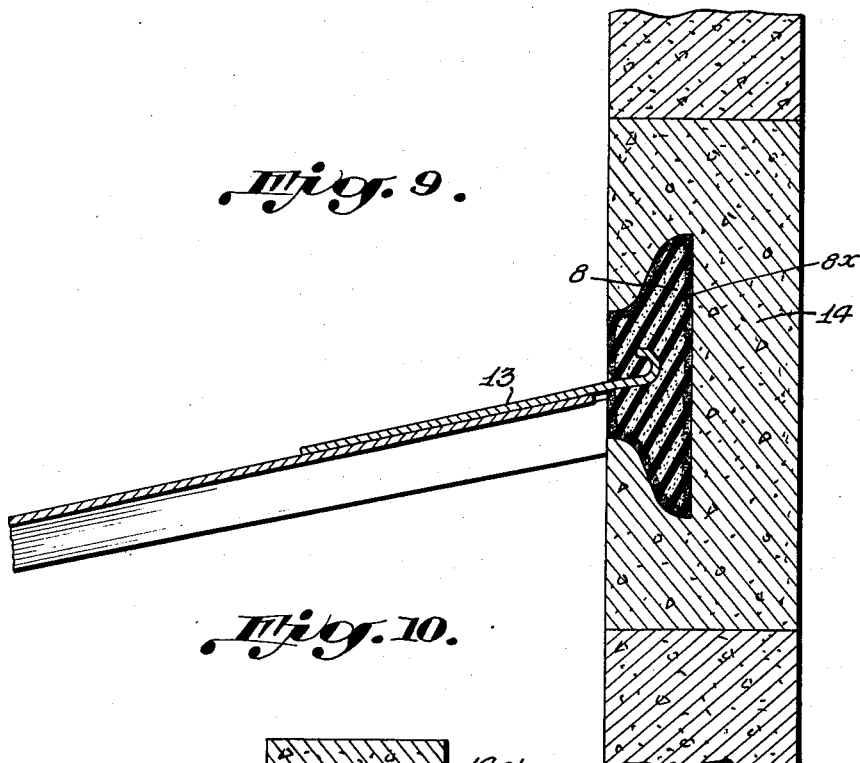
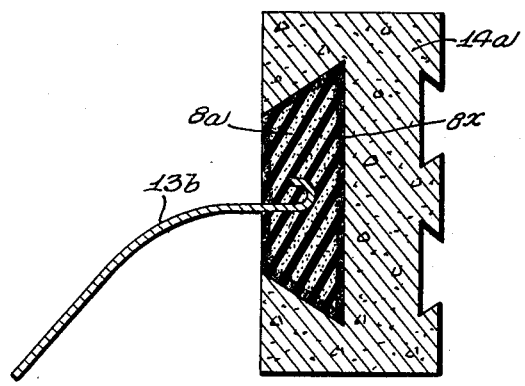
Inventor;
ALBERT C. FISCHER,
By Knight Bros
Attorneys.

Patented Feb. 6, 1945

2,368,650

UNITED STATES PATENT OFFICE 2,368,650

SELF-RESTORING WATER STOP AND OTHER WATERPROOFING PACKING

Albert C. Fischer, Chicago, Ill.

Application June 6, 1941, Serial No. 396,947

10 Claims. (Cl. 94—18)

This invention relates to various constructions of and a method of rendering self conditioning packings made of resiliently deformable material and yieldable to stresses of tension and compression imposed by structural members between which the packings are used. Typical of such packings are water-stops used at expansion joints between the meeting ends of sections of concrete and other masonry structures; also packings or caulking used in similar situations; also anchorage for roofing and other flashings used for water proofing the meeting lines between roofing members and masonry walls; and packings for other uses.

An object of the present invention is to provide a method of rejuvenating packings and particularly those portions or outer strata thereof which provide the working surfaces through which the packings coact with opposed surfaces of the structures that they are intended to pack by supplying to the said packings or the effective portions thereof, a conditioning fluid having the capacity of maintaining in at least such outer stratum of the packing, those physical properties that render the packings continuously appropriate to the duties they have to perform. The said method consists in housing within the cellular stratum of the packing the herein-described oily compound capable of being exuded from said cellular outer stratum whenever the packing body is subjected to pressure; periodically exercising such pressure to keep the flow in enveloping relation to the outer surface of the sponge rubber stratum and thus insuring presence of the fluid upon the surface that requires conditioning and in enveloping relation to the packing.

Another object of the invention is to produce a packing body which will serve as a vehicle for and hold in exudable form a fluid of such viscosity that it will not only maintain a desired surface condition in the packing body but will collect in spaces between the packing body and surrounding masonry and seal said spaces against escape of such fluid and against infiltration of moisture that would otherwise tend to pass the water-stop of which the packing forms part; a preferred embodiment of the invention being one in which the fluid contained and exuded by the packing body is a viscous oily compound that will not mix with water, but can be absorbed by a cellular compressible packing body; and the latter, in addition to being kept in service by the rejuvenating influence of said fluid upon the material of which it is made, will also serve as a dispenser of fluid having a consistency or viscosity that enables it to seal spaces, cracks and openings that may exist around the packing. I have found in practical application of the invention, that among the materials suitable for use in realizing this objective is a rubberized bituminous compound, a formula for which is exemplified by the following:

| | Per cent |
|---|---|
| Crude rubber or reclaimed rubber | 15-20 |
| Asphalt 210-230° (soft point) | 20-40 |
| Asphalt 110-130° (soft point) | 30-60 |
| Petrolatum (or similar softener) | 0- 2 |
| Tackifier | 5-10 |
| (Also cured rubber scrap may be added) | 5-20 |

In the event a more viscous composition is desired, 5 to 30% of asbestos or sisal fibers may be included in the composition, and may be used in those places where the porous cells are of large size.

The presence of a viscous oily compound as an exuding ingredient in the rubberized bituminous packing may be insured by including the oily compound in the original hot mix of the constituent ingredients of the packing. When the packing body has been so mixed and permitted to cool and bring the healing or preserving and sealing fluid charge to a state of a cold flow plastic, the packing is ready for use. The material of the packing body will not be soluble in or otherwise deteriorated by the exuded conditioning and sealing fluid. The latter is a selected compound of oily consistency in the nature of a hot pouring rubbery adhesive expansion and contraction joint material such as is commonly poured into spaces between cement pavement sections to form a seal against infiltration of water. It will soften at from 185° to 205° F. and fuse in the conventional asphalt-melting kettle when uniformly heated to around 428° F. and is adhesive to the faces of masonry on cooling to atmospheric temperature. It must be proof against cracking or spalling under deformation at low atmospheric temperatures. This material taken as a base may have its fluidity determined at will by the addition of more fluent ingredients.

The porous outer stratum of the body provides the working surface of the packing and will best be constructed of sponge rubber having ruptured cells and preferably sponge rubber of the type produced by a foaming process. It may also be desirable to use in this connection thiokol, neoprene and other types of synthetic rubber which are resistant to the solvent action of oils. Caulking, and packing strips having outer surfaces of oil resisting synthetic rubbers are particularly desirable in packing the floors of garages and other buildings where machine oils are prevalent on the floors.

Preferably the rubberized asphaltic body which is inherently compressible, is also resilient to cause it to expand when released from compression. The exuding ingredient, unlike that of saturated felt which is non-flowing and cannot be exuded, consists of a cold flow plastic that will flow sluggishly from the pores of the external stratum under pressure. I have found that the container outer stratum of the packing body herein contemplated can be satisfactorily produced from foamed latex, or foamed sponge-rubbers and rubbers otherwise specially treated to develop and open cellular structure therein; although artificial rubbers of spongy texture are most suitable for the purpose because they react less to or deteriorate less under the materials exuded as the rejuvenating and sealing fluid. I do not wish to be limited in the type of non-perishable compressible cellular material so long as it will meet the conditions here enumerated.

In the accompanying drawings:

Figure 1 is a vertical transverse section through portions of the meeting ends of two paving sections with an intervening water-stop expansion joint both the water-stop element of which and the upper or tread portion of the expansion joint core are understood to be made of rubberized asphaltic material having an outer stratum of cellular material such as sponge-rubber admitting impregnation with cold flow fluid in accordance with this invention.

Figure 6:
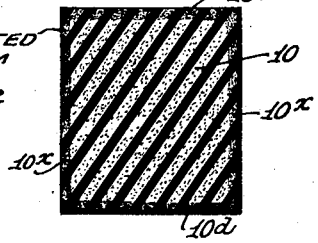

Figure 6 is a transverse section on an enlarged scale of a fluid filled rubberized bituminous or other plastic body of a packing or caulking strip in accordance with the present invention, constructed with a surrounding outer stratum of sponge rubber through which the filling may be exuded to rejuvenate the working faces provided by said stratum and seal any spaces occurring between the strip and structural surfaces which oppose it in use.

Figure 7:
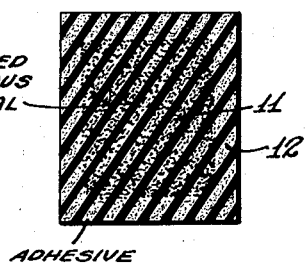

Figure 7 is a view similar to Figure 6 in which a body of rubberized bituminous material is surrounded by an outer stratum of sealing material maintained by exuding such material from the interior of the body into said stratum under pressure exerted upon the body.

Figure 8 is a sectional view of a metal flashing strip anchored in a packing strip composed of a fluid filled plastic body having a sponge-rubber outer stratum.

Figure 9 is a sectional view showing the device of Figure 8 embodied in water-stop relation to a roofing structure and a cement wall.

Figure 10 is a sectional view showing the flashing structure of Figure 8 embodied in a building unit of masonry type.

Figure 1:
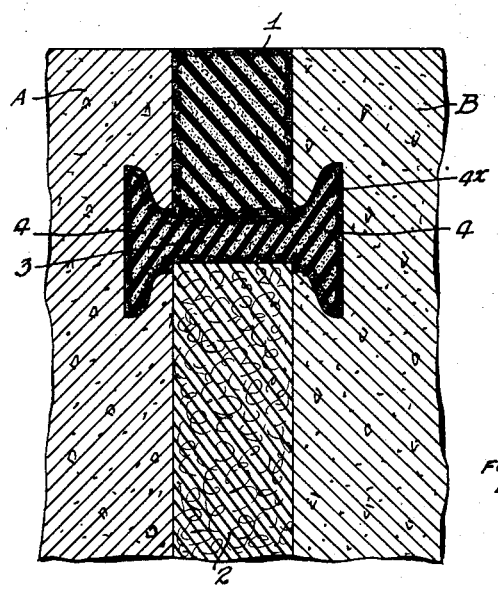

Referring to Figure 1, A, B, represent portions of two sections of masonry for instance a pavement; 1 represents the upper or tread portion of an expansion joint core, made of a rubberized asphaltic, bituminous or other plastic body having a cold flow fluid composed of oily ingredients, contained in a porous or cellular outer stratum capable of exuding said fluid under compression of said body; 2 represents the lower portion of the expansion joint core that may be made of any of the substances commonly used for such purpose, but in the present instance, for purpose of illustration, made of cellulosic material such as fibers, matted, felted, or otherwise compacted into a form appropriate to the purpose it is serving. Said core portion 2 may contain, if desired, a cold flow filler of oily fluid, or be free from such filler; and 3, 4, represent a water-stop introduced between the expansion joint core sections. Said water-stop is illustrated as being made of a body of rubberized bituminous material surrounded by a porous or cellular outer stratum 4x and comprising a bridge bar 3, spanning the space between the masonry sections A, B, and having integral anchoring wings 4 embedded water-tight, in matrices 5 in cement, caused to be formed around said wings by presenting the wings in appropriate positions to be enveloped by concrete when said sections A, B, are poured. The water-stop wings 4, and preferably the bridging body 3 as well when under pressure are made to give up conditioning and sealing fluid from their outer strata of sponge rubber 4x, in the form of cold flow viscous oily compound having the capacity of rejuvenating the working surfaces of the packing rubber; also delivering such compound gradually through the pores of said outer strata to the spaces around the water-stop; the pressure exerted being, for instance, that resulting from narrowing of the space between the masonry sections under thermal expansion of said sections; or compression exerted upon the anchoring wings by contraction of the masonry sections under a drop in temperature and consequent tension imposed upon the water-stop that draws the anchoring wings 4 toward and wedges them into constricted portions of their matrices; and the effect of pressure being to enforce exuding of the filler of the body, through the outer strata 4x of the water-stop members and the performing of the dual function of rejuvenating said outer strata 4x and supplying an envelope around the same that will seal, water-tight, any cracks or spaces between portions of the water-stop and faces of the masonry to which said portions are opposed.

Figure 2:
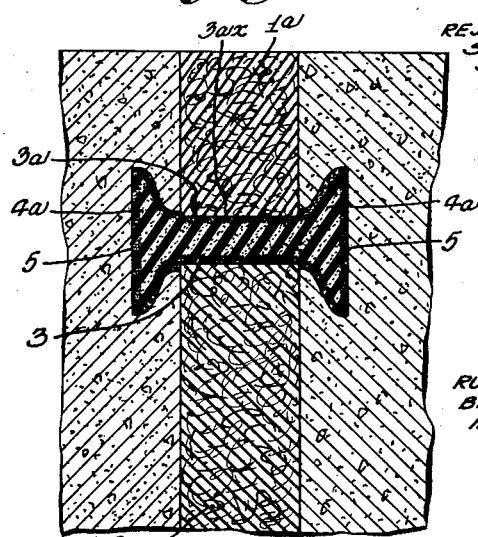
Figure 2 is a view similar to Figure 1, embodying the same water-stop but a modified expansion joint core comprising cellulosic or matted fibrous material.

Exuding of reconditioning and sealing fluid is not limited to rubberized bituminous or other mastic packing bodies. A filler made of cellulosic or fibrous packings such as shown at 2 in the lower portion of Figure 1, and at 1a, 2a, above and below the water-stop in Figure 2 may function in the same way and furnish its own porous outer stratum. Moreover the use of rubberized bituminous or asphaltic material for production of the body portions of the water-stops, cores, caulking or other packings contemplated herein is merely illustrative and may be substituted by any non-perishable material of form-retaining mass integrity capable of serving as a packing and as an exuding vehicle for the rejuvenating viscous cold flow liquid herein described.

Figure 3:
Figure 3 is a sectional view showing a modification of Figure 1 according to which the water-stop has its bridging portion deflected vertically so as to merge integrally with the tread section of the expansion joint core and by taking on a bifurcated form, greatly increasing horizontal resiliency of the water-stop.

As shown in Figure 3, the water-stop anchoring wings 4b made of fluid yielding mastic with porous jacket may be connected by a deflected body member 3b of similar composition extending upwardly and merging integrally with the similarly constituted tread portion 1b of the expansion joint core. The portions 3b, 4b, of this structure of Figure 3, may be of plastic oil filled plastics having sponge-rubber jacket 3x functioning as described in connection with the parts 1, 3 and 4 of Figure 1. The lower portion 2b of the expansion joint core of said Figure 3 may correspond in structure, filling and function, to the lower portion 2 of Figure 1 and both portions 1a and 2a of Figure 2. The bifurcated forms of the combined water-stop 3b, 4b, and tread section 1b with their porous jackets 4bx and 6x in Figure 3 lend increased horizontal resiliency to that structure under expansion and contraction of the masonry section. Compression under thermal expansion of the masonry sections is a columnal function involving one anchoring wing 4b, one leg 6 of the bifurcated core, the intruded fibrous flange 7, of the lower core member, the other leg 6 and the other wing 4b. Hence exuding pressure is received by all the parts notwithstanding the complexity of the structure.

Figure 4:
Figure 4 is a sectional detail view of a filled sponge-rubber coated anchoring strip for a water-proofing flashing or similar structural device.

According to Figure 4, an anchoring strip 8 made of oil filled mastic with outer stratum 8x of sponge-rubber, may have the characteristic dove-tailed section enabling it to be firmly embedded in concrete and when so embedded it may serve as a self-preserving water-tight anchorage for various adjunctive devices.

Figure 5:
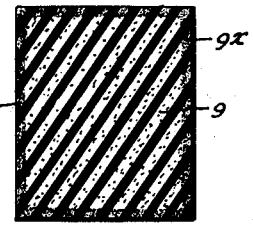
Figure 5 is a transverse section, on an enlarged scale, of a fluid carrying bar having a cellular coating or outer stratum made of foamed latex and constituting an expansion joint core, caulking or other packing embodying the present invention.

As disclosed in Figure 5, the packing 9, such as those described herein, for instance expansion joint core, filler strips, caulking, etc. may have an outer stratum 9x made of foamed latex.

As suggested in Figure 6, a fluid filled packing strip 10 may have its working faces 10a, 10b, 10c, 10d, made of a stratum 10x of sponge rubber or other cellular structure into and through which the rejuvenating and joint sealing oil may be exuded.

According to Figure 7, the interior 11, of the packing, filler bar, expansion joint core or caulking, may be made of adhesive material such as rubberized bituminous material surrounded by a substantial wall 12 of porous material impregnated with such adhesive.

Figures 8, 9 and 10 suggest uses for the self preserving water-tight anchoring strip 8, with its porous stratum 8x, namely for mounting a flashing strip 13 (Figure 8) adapted to be embedded in a concrete wall 14 and overlie an adjacent roof 15 (Figure 9) or to be conveniently shortened into lengths 8a suitable for embedding in masonry blocks 14a appropriate for manipulation and introduction into a masonry wall and presenting the flashing 13b in convenient position for use.

The several disclosures herein selected for illustration of my invention are to be taken as mere types of application rather than limitation of use to which the invention may be put.

I claim:

1. A water-proofing packing comprising a body containing an exudable viscous oily treating fluid and provided with an outer stratum forming the surface by means of which the body acts to check the flow of external moisture and with pores into which the treating fluid when exuded may flow; said body being collapsible under pressure, to cause said fluid to exude into said pores.

2. A water-proofing packing as claimed in claim 1, wherein the outer stratum is of ruptured cellular construction whereby a controlled flow of the treating fluid is attained.

3. A water-proofing packing as claimed in claim 1, wherein the body and its outer stratum are both resiliently compressible.

4. A water-proofing packing as claimed in claim 1, wherein the outer stratum is of a cellular structure of foamed latex.

5. A water-proofing packing body as claimed in claim 1 constructed with an anchoring wing embodying a deformable inner mass containing an exudable fluid in a surrounding stratum of cellular structure impregnated by said fluid; said wing being presented by said body in position to be enveloped in a cement section poured adjacent the body.

6. A water-proofing packing comprising a body member and wings connected together by said body member; said body member and wings being of resilient deformable structure and carrying an exudable oily viscous fluid; said wings being presented by the body member in positions to cause said wings to be surrounded by and to mold matrices in cement poured adjacent to the body member; said wings having a section that imparts a tapered form to the matrices which they respectively form; and said wings being compressed when drawn by tension into constricted portions of said matrices.

7. A combined water-stop and expansion joint, said water-stop comprising anchoring wings and a bifurcated body comprising depending legs carrying said anchoring wings in positions to be embedded by concrete sections cast against the expansion joint; said expansion joint having a core member intruded into the bifurcation space of the water-stop and sustaining the wings and legs under compression imposed by the cement sections when in use.

8. A combined water-stop and expansion joint as claimed in claim 7 wherein the legs carry an oily viscous exudable fluid and are of compressible construction.

9. A combined water-stop and expansion joint; said water-stop having a compressible structure containing an oily viscous fluid and comprising anchoring wings, an upwardly extending bifurcated body having depending legs carrying said wings in positions to be enveloped in cement sections poured against the expansion joint and said expansion joint comprising an upper core-member with which the upwardly extending body integrally merges, and a lower core member that extends into the bifurcation space of the said body.

10. A combined water-stop and expansion or contraction joint comprising wings in positions to become embedded in masonry sections poured against the joint and a space-bridging body member uniting said wings; said body member being bifurcated between and deflected upwardly from said wings and by its deflection leaving said wings free to move relatively under expansion and contraction of the masonry sections; and at least said wings being formed with cellular spaces containing an exudable oily viscous liquid.

ALBERT C. FISCHER.